3,419,471
PREPARATION OF ALBUMIN-FREE LYSOZYME
Yoshitaka Matsuoka, Yoshio Hidaka, Masayuki Yoshizawa, and Akira Hashimoto, Tokyo, Japan, assignors to Eisai Co., Ltd., Tokyo, Japan, a corporation of Japan
No Drawing. Filed Mar. 14, 1966, Ser. No. 533,838
Claims priority, application Japan, Apr. 19, 1965, 40/22,707; June 16, 1965, 40/35,505
7 Claims. (Cl. 195—66)

This invention relates to the preparation of albumin-free lysozyme from egg white in a crystalline or amorphous form suitable for medical uses so as to be administered by injection.

Lysozyme (EC 3, 2, 1, 17) is a cationic protein of an isoelectric point of 10.5 discovered by Fleming as a bacteriolytic enzyme of egg white, hydrolyzes the $\beta(1\to 4)$ linkage of mucopolysaccharide or mucopeptide and is also called muramidase. This enzyme is widely distributed in nature. It is found not only in egg white but also in a great number of tissues and secretions of different animals, vertebrates and invertebrates, and in plants.

Lysozyme has various pharmacological properties as follows: agglutainating action, hemostatic action, anti-infectious and anti-viral action, action favouring regenerative and cicatrizating process, antiphlogistic action, and normalizing action of enteric flora. (The toxicity of this enzyme is very slight and even absent in its practical applications.)

These different actions of this enzyme are largely utilized in the treatment of various diseases and many surgical conditions: for example, viral and bacterial infections, hemorrhagic conditions, gastro-intestinal diseases, and so on, and also in the prophylactic treatment of general diseases and of troubles of nutrition in new borns and in infants. Besides, this enzyme can be applied in the food industry.

Several laboratory methods of preparing lysozyme have been reported. Among them, the direct crystallization method of G. Alderton and H. L. Fevold (J. Biol. Chem., vol. 164, p. 1, 1946) can be adapted to the production on an industrial scale. This is done by adding 5% of NaCl to egg white, adjusting the pH to 9.5 with NaOH, seeding with a small amount of crystalline lysozyme, and allowing the mixture to stand at 4° C. for several days. Then 60-80% of lysozyme contained in the egg white is crystallized. Thus obtained crude lysozyme is purified by recrystallization procedure in the form of isoelectric lysozyme or its salts.

The lysozyme or lysozyme chloride prepared by the above method is of a monopattern in a moving boundary electrophoresis but is not of a single component in a zone electrophoresis on a polyacrylamide-gel, and more than 0.1% of albumins (ovalbumins and conalbumin) is detected as impurities. Such impure lysozyme can be used for medicines to be orally administered. But even a slight amount of egg white albumins parenterally administered can cause an anaphylactic shock. Therefore, in order to be used for injectable medicinal and pharmaceutical preparation, it must be further refined and albumins of impurities must be removed as much as possible.

Even by the direct crystallization method, if the recrystallizing operation is repeated more than five times as isoelectric lysozyme or its salts, lysozyme or its salts of a high purity containing less than 0.01% of albumins will be obtained. However, the repeated recrystallization is inevitably followed by important decrease in the yield of the enzyme. Thus, it is unsuitable for an industrial refining method.

As a method of refining lysozyme on a laboratory scale and removing the slight amount of the impure proteins, there is reported a chromatography wherein is used a column of a cation exchange resin (Amberlite IRC-50, Rohm & Haas Co., U.S.A.) (H. H. Tallan and W. H. Stein; J. Biol. Chem., vol. 200, p. 507, 1953). However, in said method, it is required a cation exchange resin in an amount more than 100 times as large (on the dry weight) as of lysozyme to be refined. So the apparatus must be large and the volume of the effluent will be enormous and the concentration of lysozyme in the effluent will be very diluted. Therefore, it can be said that the above method is not practical in the industry.

If a cation exchange dextran or cation exchange cellulose is used instead of the cation exchange resin, the required amount of the cation exchanger will be far smaller, but, yet, about same amount or more exchanger (on the dry weight) for lysozyme to be treated will be required. So long as it is a chromatography, the effluent curve of each lot must be monitored and a considerable increase of the volume of the effluent will be inevitable. Therefore, said method is not so substantially different from the chromatography by a cation excahnge resin and requires a very complicated step for the industrialization.

We have a studied a method of removing only impure proteins from lysozyme based on the facts that impure proteins (albumins) contained in egg white lysozyme are all anionic proteins (the isoelectric points of ovalbumin and conalbumin are 4.6 and 6.0, respectively), while lysozyme is a cationic protein (of an isoelectric point of 10.5). And we have succeeded in efficiently removing the slight amount of albumins contained in lysozyme by a very simple operation of filtering a lysozyme solution, using an anion exchange dextran or anion exchange cellulose as a filtering material. This method has made it possible to industrially produce refined lysozyme which has no danger of causing an anaphylactic shock when injected.

The principle of the present invention which is entirely different from that of the ion exchange chromatography, is that only impure proteins are selectively adsorbed whereas lysozyme pass through a filtering material without being adsorbed. Therefore, the present invention should be called "ion exchange filtration method" and is characterized by the fact that the required amount of the ion exchanger therein may be much smaller than that in the ion exchange chromatography. Generally, the required amount of the ion exchanger may be not more than 1/5 of the amount of lysozyme to be treated. Therefore, as the volume of the filtrate is not increased at all, concentration of the filtrate will not be required after the treatment. (In the ion exchange chromatography, because of the great increase of the volume of the effluent, a concentration is required after the treatment.) Further, such monitoring of the effluent curve as in the case of the chromatography is not required. Therefore, the operation is very simple. This fact is a great advantage to the industrial production. According to the present invention, albumins in such slight amount as of a 1/1000 order remaining in an egg white lysozyme preparation can be easily eliminated.

The present invention is carried out by desalting an aqueous solution of crude lysozyme or its salts containing albumins and inorganic salts as impurities, then adjusting the pH of the solution to 6.5-10.0 and the ionic strength of the solution to 0.01-0.5 by adding a buffer solution and filtering the solution by using as a filtering material an anion exchange cellulose or anion exchange dextran previously bufferized with a buffer solution of the same pH and ionic strength as the enzmyl solution. The proper concentration of the lysozyme solution to be filtered is from 1 to 10%.

In the present invention, the suitable filtering materials for the ion exchange filtration are anion exchange celluloses such as GE-cellulose, TEAE-cellulose, DEAE-cellulose and AE-cellulose and anion exchange dextrans such as DEAE-dextrans (e.g. DEAE-Sephadex A–50).

However, anion exchange resins are not suitable., since the exchange ability of the resins for proteins is so low.

The pH conditions in which these anion exchange celluloses and anion exchange dextrans do not absorb lysozyme but selectively adsorb only albumins, is to be higher than 6.0, the isoelectric point of conalbumin. On the other hand, as the pH of lysozyme solution approaches toward 10.5, the solubility of lysozyme will be quickly reduced. Therefore, the filtration with an anion exchange filtering material is carried out in a pH range of 6.0–10.5. However, in view of the amount of adsorption of albumins on an anion exchanger and the solubility of lysozyme, it is preferable to carry out the filtration at a pH of 6.5–10.0.

Further, the amount of adsorption of albumins on an anion exchanger is influenced by the ionic strength of the buffer solution. Under the same pH conditions, the lower the ionic strength, the larger the amount of adsorption of albumins. When the ionic strength of the buffer solution is stronger than 0.5, under any pH conditions, albunmins will not be substantially adsorbed. Therefore, the ionic strength of the buffer solution should be below 0.5 within a range having a buffering ability. Specifically at an ionic strength of 0.1–0.1, the filtration can be made efficiently.

Under the above-mentioned conditions, lysozyme is not substantially adsorbed and the enzyme activity is not decreased during the operation.

Thus, in the ion exchange filtration method, the pH and the ionic strength of the lysozyme solutions are important factors. Therefore, crude lysozyme containing inorganic salts must be previously desalted before the ion exchange filtration for dealbumination is carried out. In some cases, the desalting operation may be required after this filtering procedure.

Now, generally, inorganic salts in an enzyme solution are eliminated by a dialysis with semipermeable membrane such as a collodion membrane or cellophane membrane. Further, desalting with an ion exchange resins using a mixed bed apparatus is often applied. An electric dialysis may also be used.

The dialysis with a semipermeable membrane is the most common and simplest. But, there is a limit to the treated amount. Even if such large seamless cellophane tube developed in recent years as, for example, a Visking seamless cellulose tube is used, it will not be suitable for an industrial production scale. As a method replacing it can be mentioned an electric dialysis with which a mass treatment is possible. Its greatest defect in desalting a solution of lysozyme or its salts is that, though lysozyme is an enzyme protein, lysozyme molecules themselves will pass through the semipermeable membrane. Needless to say, the diffusing velocities of inorganic salts and lysozyme molecules are so different from each other that, even by the dialysis, the purpose of desalting will be attained. However, it is inevitable that, the longer the dialyzing time, the less the yield of lysozyme.

While the desalting method with an ion exchange resin is an excellent method which can be used for mass treatment, it can not be applied to all enzymes. For, in some enzymes, the activities may be lost by the ion exchanging treatment. Now the desalting of a lysozyme solution with an ion exchange resin was reported by H. H. Tallan and W. H. Stein (J. Biol. Chem., 200, 507 (1953). According to them, when a lysozyme solution was desalted with a mixed bed type resin column of Amberlite IR–120 and IRA–400, the recovery rate of lysozyme was only 75%. It is concluded therein that it is impossible to desalt a lysozyme solution by a mixed bed type ion exchange resin treatment without denaturation of the enzyme.

We have investigated a double bed type ion exchange resin treating method without using the mixed bed type and have succeeded in desalting a lysozyme solution without losing the activity. This is carried out by treating the solution first with a cation exchange resin and then with an anion exchange resin so that cations of low molecules may be separately removed.

According to this method, the recovery rate of the lysozyme protein is more than 95% and the lysozyme solution can be desalted without inactivation of lysozyme at all. Further, in the case of the conventional mixed bed type, the pH of the desalted lysozyme solution is limited to be near the isoelectric point of lysozyme (pH 10.5), whereas, in this method, it has a feature that the pH can be adjusted to be as desired by controlling the amount of use of the anion exchange resin. In fact, in the intermediate step of producing lysozyme, a desalted solution of a pH other than the isoelectric point of lysozyme is required. However, the lysozyme solution is so unstable in alkalinity that, if the anion exchange resin treatment is carried out first in the double bed type, as a result of it, the solution will be strongly alkaline and the activity of the lysozyme will be lost.

Accordingly, it is preferable that a solution of lysozyme or its salts containing low molecular salts is first treated with a cation exchange resin in a calculated amount or in an excess of the calculated amount so that inorganic cations may be removed and then the acidic solution of lysozyme obtained by removing the cation exchange resin is treated with an anion exchange resin in an excess, in a calculated amount or in an amount smaller than the calculated amount.

Generally, an enzyme protein is so unstable in a strongly acid or strongly alkaline solution as to be denaturated irreversible and to be inactivated. However, we have discovered that, even if the solution is left in a strong acidity of a pH of less than 1 at the room temperature for more than 24 hours, the lysozyme activity is not lost. Accordingly, in the double bed type ion exchange resin desalting method as above described, when inorganic cations are removed by the first cation exchange resins treatment, the pH of the solution will remarkably reduce and the solution will become strongly acidic, but lysozyme is not inactivated during the treatment. However, in order to obtain the sufficient effect of the cation exchange resin, it is desirable that the pH of the lysozyme solution after the cation exchange resin treatment should be kept higher than 1.5. The higher the salt concentration in the solution, the lower the pH of the solution treated with the cation exchange resin, but the pH will be somewhat elevated under the influence of the coexisting enzyme protein. On the other hand, since the viscosity of the solution will increase in proportion to the protein concentration, when said viscosity is too high, the resin treating operation will be difficult. Therefore, when the lysozyme concentration is about 5–10%, the treatment will be the easiest.

For the desalting of a lysozyme solution by the above method, almost all sorts of cation exchange resins can be efficiently used. However, in the case of the cation exchange resin of an M. R. type having a highly porous or macroreticular structure such as Amberlite 200, the adsorption of the lysozyme protein itself will occur and the recovery rate of lysozyme will be reduced. As an example showing the desalting effect of a cation exchange resin, 2 g. of each of various kinds of cation exchange resins (in a wet state) were added to 10 ml. of an aqueous solution of 10% lysozyme chloride containing 2.8% of NaCl and the solution was treated at the room temperature for 1 hour. The results of measuring the variation of the pH, the content of the remaining NaCl, the recovery rate of the lysozyme and the specific activity per mg. of the lysozyme protein are shown in Table 1.

TABLE 1: DESALTING EFFECTS OF STRONG ACID CATION EXCHANGE RESINS AND THEIR INFLUENCES ON LYSOZYME

| Cation exchange resins | pH | Content of remaining NaCl in percent | Recovery rate of lysozyme in percent | Rate of residual specific activity of lysozyme in percent |
| --- | --- | --- | --- | --- |
| Control (not treated) | 4.4 | 2.8 | 100 | 100 |
| Dowex 50W-X1 | 2.2 | 0.045 | 100.7 | 106.0 |
| Dowex 50W-X2 | 2.2 | 0.043 | 99.6 | 101.5 |
| Dowex 50W-X4 | 2.1 | 0.031 | 99.1 | 99.5 |
| Dowex 50W-X8 | 2.1 | 0.022 | 102.1 | 99.7 |
| Dowex 50W-X10 | 2.1 | 0.054 | 100.0 | 104.1 |
| Dowex 50W-X12 | 2.1 | 0.045 | 99.5 | 95.7 |
| Dowex 50W-X16 | 2.1 | 0.030 | 100.2 | 102.8 |
| Amberlite IR-120 | 2.2 | 0.032 | 99.8 | 102.0 |
| Amberlite IR-124 | 2.1 | 0.040 | 101.5 | 98.5 |
| Amberlite 200 | 1.7 | 0.098 | 70.1 | 91.5 |

On the other hand, in the case of anion exchange resins, even in the M.R. type, no adsorption of the enzyme protein occurred. Therefore, they can be used in the same manner as in ordinary gel resins.

Either of the batch method or the column method can be applied to the cation exchange resin treatment. However, in the case of the anion exchange resin treatment, when the pH is to be lower than the isoelectric point of lysozyme, the batch method will be convenient. That is to say, when an anion exchange resin in a calculated amount or in an excess is used, the pH of the desalted lysozyme solution will reach the vicinity of the isoelectric point of lysozyme. But, if a proper amount smaller than the calculated amount is used, the pH will be able to be adjusted to be any below the isoelectric point of lysozyme.

Lysozyme and/or its salts purified by the present invention is homogeneous in a moving boundary electrophoresis and a zone electrophoresis on a polyacrylamide gel. The ovalbumins and conalbumin content therein by an immunological assay is about 0.005%. When the ion exchange filtration is carried out again, even by the immunological assay, the albumins are not detected in the purified lysozyme preparation. During this operation, the recovery of lysozyme is almost 100%.

The procedure of the present invention is shown in the following scheme:

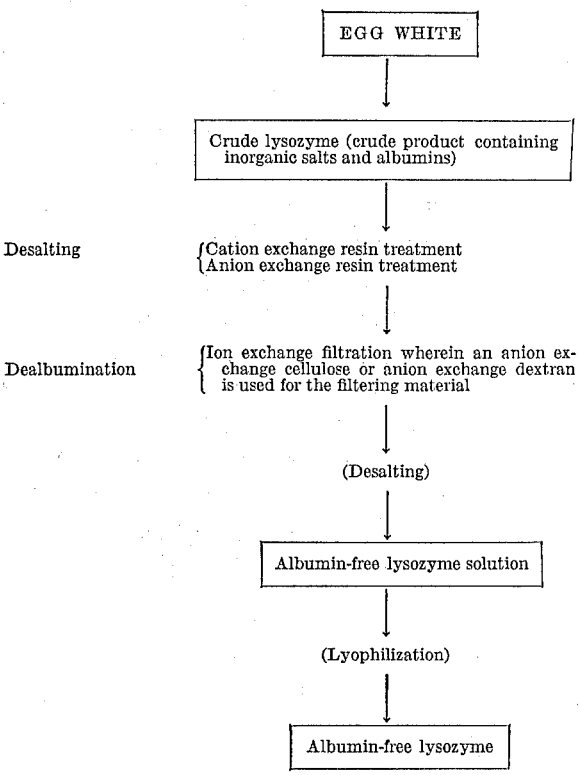

The activity of lysozyme was determined by measuring the lysis of suspension of Micrococcus Lysodeikticus ATCC 4698 by a turbidimetric method. Said measuring method was a modification of G. Litwack (Proc. Soc. Exptl. Biol. Med., vol. 89, p. 401, 1955). A suspension of lyophilized Micrococcus Lysodeikticus (in M/15 phosphate buffer solution of pH 6.2) prepared so that the reading of a photoelectric colorimeter (Leitz photrometer), when a red filter (of a center wave length of 640 m$\mu$) was used, might be the extinction value of 1.0, was made a substrate solution. The difference $(Eo-E)$ between the extinction value (E) when the same amount of an enzyme solution was added to the substrate solution and the above mixed solution was made to react at 35° C. for 10 minutes, and the extinction value (Eo) when the same amount of a buffer solution was added instead of the enzyme solution and the mixed solution was treated in the same manner, was made the amount of lysed bacteria. The activity corresponding to the difference $(Eo-E)/1.0$ of the extinction value to be reduced per minute when lysozyme contained in 1 ml. of the reaction solution was acted under the above-mentioned conditions was determined to be one unit.

A polyacrylamide gel electrophoresis was applied to the detection of more than 0.1% of albumins contained in crude lysozyme. That is to say, when a constant current of 9 ma./cm.$^2$ (70 volts) was passed with a tris-(hydroxymethyl)amino methane buffer solution (of an ionic strength of 0.09) for 4 hours, lysozyme moved by 35 mm. toward the cathode and conalbumin and ovalbumin moved by 4 and 20 mm., respectively, toward the anode. When they were dyed with Amide Black–10B, the limit of detection of albumins was about 5$\gamma$, and more than 0.1% of albumins contaminated in lysozyme could be detected.

In the case of refined lysozyme containing not more than 0.1% of albumins, it was so difficult to detect albumins by a physico-chemical process that albumins were detected by an immunological method. That is to say, the slight amount of albumins contained in lysozyme could be detected by P.C.A. method using a guinea pig passively sensitized with rabbit-anti-ovalbumin or with rabbit-anti-conalbumin (Z. Ovary: Progress in Allergy, vol. 5, p. 459, 1958), or by the method of hemagglutination inhibition reaction with tannic acid-protein conjugated sheep erythrocytes (A. B. Stavitsky, J. Immunol., vol. 72, p. 360, 1954), a tannic acid treated sheet erythrocyte coagulation. By using such immunological assay, the presence of more than about 0.005% of either of ovalbumin or conalbumin in the lysozyme could be detected.

Further, the lysozyme protein concentration in the solution was quantitatively determined by an ultraviolet absorption spectrum measuring method. The extinction coefficient $$(E_{1\text{ cm.}}^{1\%} 280\ m\mu)$$

at 280 millimicrons was 26.35. (A. J. Sophianopoulos, C. K. Rhodes, D. N. Holcoms, K. E. Van Holde, J. Biol. Chem., vol. 237, p. 1107, 1962.) The NaCl was quantitatively determined by a flame photometric method.

Examples of the present invention are given in the following:

Example 1.—8 g. of crude crystals of isoelectric lysozyme (containing about 0.2% conalbumin, less than 0.1% ovalbumin and 2.7% NaCl) prepared by a bentonite adsorption procedure of Alderton et al. (recrystallized 3 times) were dissolved in 100 ml. of water. The solution was dialyzed and was then adjusted by adding a borate buffer of pH 8 (the final concentration of lysozyme was 4% in M/100 borate buffer).

This solution was filtered with a filtering column charged with 2 g. (as a dry weight) of GE-cellulose (guanidoethyl celluose) previously treated with a M/100 borate buffer of pH 8.0.

When the filtrate was dialyzed against 10$^{-3}$N-HCl and was lyophilized, 6.2 g. of refined lysozyme chloride were obtained. The lysozyme activity was 57 units/mg. The product was a single component by a polyacrylamide gel electrophoresis. The content of albumins by an immunological assay was about 0.005%.

Example 2.—20 g. of a powder of crude lysozyme chloride (containing about 0.5% conalbumin, about 0.2% ovalbumin and about 4% NaCl) prepared by the direct crystallization procedure of Alderton et al. (recrystallized once) were dissolved in water so as to be a solution of 10%. The solution was passed through a column charged with about 50 g. of Dowex 50W-X8 (as wet resin) previously prepared as an H type and was washed with water until lysozyme protein was not detected. The effluent and the washings were combined together. Dowex 1X8 previously prepared as an OH type was gradually added to the combined solution with stirring so as to make its pH to 7.5. The content of NaCl in this solution was 0.02% to the lysozyme present as dissolved in the solution. The recovery rate of lysozyme was 96%.

Example 3.—The solution (containing 19.2 g. of lysozyme) obtained in Example 2 was adjusted by adding a phosphate buffer of pH 7.5 so as to make its final concentration of lysozyme to about 5% in M/100 phosphate buffer. The slight amount of insolubles was removed.

This clear solution was filtered with a filtering column charged with 2 g. (as a dry weight) of DEAE-Sephadex A-50 (diethylaminoethyl-Sephadex A-50) previously bufferized with a phosphate buffer (pH 7.5) of M-100. The recovery rate of lysozyme by this filtering procedure was 98%.

To half volume of the filtrate, about 5 g. of Amberlite IR-120 (as wet resin) previously prepared as an H type was added and the mixture was stirred at the room temperature for about 1 hour. The resin was removed by filtration and was washed three times with the minimum volume of water. The filtrate and the washings were combined and neutralized by gradually adding Amberlite IRA-410 previously prepared as an OH type. The resin was filtered away, washed three times with the minimum volume of water, and then the washers were combined with the filtrate. When the mixture was lyophilized, a refined lysozyme powder was obtained. The recovery rate of lysozyme was 98.4%. It was a single component by a polyacrylamide gel electrophoresis. By an immunological assay, about 0.005% of albumins was determined in the preparation. The content of inorganic salts was 0.03%.

Example 4.—When the filtrate dealbuminated by the ion exchange filtration by using DEAE-Sephadex A-50 as a filtering material in Example 3 was once again subjected to the ion exchange filtration under the same conditions without desalting and lyophilization, it was impossible to detect albumins even by the immunological assay. During the twice repeated ion exchange filtrations, 96% of lysozyme could be recovered.

Then the filtrate was dialyzed against $10^{-3}$N-HCl and filtered using Millipore filter, and lyophilized. Thus, a powder of albumin-free and salt-free lysozyme chloride suitable for injection was obtained. The recovery rate of lysozyme was 75%.

Crude crystalline lysozyme chloride containing albumins and albumin-free lysozyme chloride obtained in Example 4 were tested by the following testing method on anaphylaxis.

Method.—Male healthy guinea pigs each weighing 250 to 350 g. are used. Each of 10 guinea pigs are intramuscularly injected 10 mg. of lysozyme per kg. of body weight five times every other day. In 21 to 28 days after the last injection, challenge-injection of 10 mg./kg. of lysozyme is given to each guinea pig by intramuscular route. Those treated in the same manner with saline are used as controls. After the challenge-injection, the reaction of the animals are observed for 15 minutes. Those which showed such strong shock (anaphylactic shock) as an ataxia and a convulsion, etc. or died are positive. In case all are negative, the samples taken for the test are judged to be non anaphylactic.

Results.—The results obtained in the tests were summarized in following Table 2.

| Exp. No. | Tested lysozyme chloride | Number of tested animals | Negative | Positive |
|---|---|---|---|---|
| 1 | Crude crystalline lysozyme chloride containing albumins.[1] | 9 | 0 | 9 |
| 2 | Albumin-free lysozyme chloride in Example 4. | 10 | 10 | 0 |

[1] Lysozyme chloride crystals prepared by the direct crystallization procedure of Alderton et al. (recrystallized once) were dialyzed and desalted and were then lyophilized. It contained 0.2% of ovalbumin and 0.5% of conalbumin.

The embodiments of the invention in which an exclusive property or privilege is claimed are defined as follows:

1. Process for preparing albumin-free lysozyme, which comprises desalting an aqueous solution of crude lysozyme or its salts containing albumins and inorganic salts as impurities, adjusting the pH of the desalted solution to 6.0–10.5 and the ionic strength of the desalted solution to not more than 0.5 by the addition of buffer solution and filtering said solution by using a material selected from the group comprising of anion exchange celluloses and anion exchange dextrans as a filtering material, adsorbing said albumins on said filtering material and obtaining albumin-free lysozyme as filtrate.

2. The process according to claim 1 wherein the pH of said desalted solution is adjusted to 6.5–10.0.

3. The process according to claim 1 wherein the ionic strength of said desalted solution is adjusted to 0.01–0.1.

4. The process according to claim 1 wherein said aqueous solution of crude lysozyme or its salts is desalted by a double bed type ion exchange resin treatment.

5. The method according to claim 4 wherein said double bed type ion exchange resin treatment is conducted by first removing cations with a cation exchange resin and then removing anions with an anion exchange resin.

6. The process according to claim 1 wherein said anion exchange cellulose is selected from the group comprising of GE-cellulose, TEAE-cellulose, DEAE-cellulose and AE-cellulose.

7. The process according to claim 1 wherein said anion exchange dextran is DEAE-dextran.

References Cited

UNITED STATES PATENTS 2,579,455  12/1951  Alderton et al. _____ 195—66
3,184,394  5/1965  Schmidtberger et al. ___ 195—66

OTHER REFERENCES

Shinka et al., Biken Journal 5, 181–200 (1962).
Hannouz, Path. Microbiology 28, 139–146 (1965).

LIONEL M. SHAPIRO, *Primary Examiner.*